US012634305B2

(12) United States Patent
Freitas De Araujo Filho et al.

(10) Patent No.: US 12,634,305 B2
(45) Date of Patent: May 19, 2026

(54) UNSUPERVISED GAN-BASED INTRUSION DETECTION SYSTEM USING TEMPORAL CONVOLUTIONAL NETWORKS, SELF-ATTENTION, AND TRANSFORMERS

(71) Applicant: TELEFONAKTIEBOLAGET LM ERICSSON (PUBL), Stockholm (SE)

(72) Inventors: Paulo Freitas De Araujo Filho, Recife (BR); Mohamed Naili, Montreal (CA); Georges Kaddoum, Laval (CA); Emmanuel Thepie Fapi, Cote-Saint-Luc (CA); Zhongwen Zhu, Saint-Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 18/563,272

(22) PCT Filed: Jun. 6, 2022

(86) PCT No.: PCT/IB2022/055261
§ 371 (c)(1),
(2) Date: Nov. 21, 2023

(87) PCT Pub. No.: WO2022/259125
PCT Pub. Date: Dec. 15, 2022

(65) Prior Publication Data
US 2024/0250963 A1 Jul. 25, 2024

Related U.S. Application Data

(60) Provisional application No. 63/197,571, filed on Jun. 7, 2021.

(51) Int. Cl.
*H04L 9/40* (2022.01)
*G06N 3/088* (2023.01)

(52) U.S. Cl.
CPC ......... *H04L 63/1416* (2013.01); *G06N 3/088* (2013.01); *H04L 63/1425* (2013.01); *H04L 63/1441* (2013.01)

(58) Field of Classification Search
CPC ............. H04L 63/1416; H04L 63/1425; H04L 63/1441; G06N 3/088
See application file for complete search history.

(56) References Cited

U.S. PATENT DOCUMENTS

| | | | |
|---|---|---|---|
| 8,418,249 B1 * | 4/2013 | Nucci | ................... G06F 21/552 709/225 |
| 10,956,808 B1 * | 3/2021 | Bhardwaj | .............. G06N 3/044 |

(Continued)

OTHER PUBLICATIONS

A. A. Diro et al., Deep Learning: The Frontier for Distributed Attack Detection in Fog-to-Things Computing, IEEE Communications Magazine • Feb. 2018.

(Continued)

*Primary Examiner* — Thomas J Dailey
(74) *Attorney, Agent, or Firm* — Ericsson Inc.

(57) ABSTRACT

There is provided a method for detecting cyber-attacks at edge servers. The method comprises receiving network traffic. The method comprises extracting and normalizing network flow features from the network traffic to produce a data pattern for evaluation. The method comprises computing an anomaly detection score for the data pattern for evaluation. The method comprises comparing the anomaly detection score with a threshold and determining if the network traffic corresponds to normal traffic or to an anomaly. The method comprises, upon determining that the network traffic corresponds to an anomaly, mitigating malicious network traffic by triggering a mitigation strategy and sending an anomaly message to an anomaly classifier. A method for classifying cyber-attacks at a cloud server is also provided.

10 Claims, 10 Drawing Sheets

(56) References Cited

U.S. PATENT DOCUMENTS

| | | | | | |
|---|---|---|---|---|---|
| 11,481,637 | B2 * | 10/2022 | Malaya | .................. | G06N 3/094 |
| 11,611,588 | B2 * | 3/2023 | Vasu | ................... | H04L 63/1425 |
| 11,936,667 | B2 * | 3/2024 | Salji | ......................... | G06N 7/01 |
| 11,960,978 | B2 * | 4/2024 | Crabtree | ................ | G06N 5/022 |
| 2022/0014554 | A1 * | 1/2022 | Vasu | ........................ | H04L 63/20 |
| 2022/0383071 | A1 * | 12/2022 | Sun | ........................ | G06V 10/82 |

OTHER PUBLICATIONS

A. Creswell et al., Generative Adversarial Networks, Digital Object Identifier 10.1109/MSP.2017.2765202 Date of publication: Jan. 9, 2018.

A. Ferdowsi et al., Generative Adversarial Networks for Distributed Intrusion Detection in the Internet of Things, 2019 IEEE.

A. Nisioti et al., From Intrusion Detection to Attacker Attribution: A Comprehensive Survey of Unsupervised Methods, IEEE Communications Surveys & Tutorials, vol. 20, No. 4, Fourth Quarter 2018.

A. Sharma et al., Analysis of Security Data from a Large Computing Organization, 2011 IEEE.

A. Vaswani et al., Attention Is All You Need, arXiv:1706.03762v5 [cs.CL] Dec. 6, 2017.

D. Ding et al., A survey on security control and attack detection for industrial cyber-physical systems, Neurocomputing vol. 275, Jan. 31, 2018, pp. 1674-1683.

D. Li et al., Anomaly Detection with Generative Adversarial Networks for Multivariate Time Series, arXiv:1809.04758v3 [cs.LG] Jan. 15, 2019.

H. Choi et al., Unsupervised learning approach for network intrusion detection system using autoencoders, The Journal of Supercomputing (2019) 75:5597-5621, https://doi.org/10.1007/s11227-019-02805-w.

H. Zenati et al., Adversarially Learned Anomaly Detection, 2018 IEEE International Conference on Data Mining.

I. V. Tetko et al., Artificial Neural Networks and Machine Learning, ICANN 2019.

L. Kaiser et al., "Tensor2Tensor Transformers New Deep Models for NLP", 2017.

M. Abdel-Basset et al: "Semi-Supervised Spatiotemporal Deep Learning for Intrusions Detection in IoT Networks", IEEE Internet of Things Journal, IEEE, USA, vol. 8, No. 15, Feb. 19, 2021.

M. Arjovsky et al., "Wasserstein Generative Adversarial Networks", Proceedings of the 34th. International Conference on Machine Learning, Sydney, Australia, PMLR 70, 2017. Copyright 2017 by the author(s).

M. S. Haghighi et al., "A Machine Learning-based Approach to Build Zero False-Positive IPSs for Industrial IoT and CPS with a Case Study on Power Grids Security", 0093-9994 (c) 2020 IEEE. Personal use is permitted, but republication/redistribution requires IEEE permission. 2020.

M. Tan et al., "A Neural Attention Model for Real-Time Network Intrusion Detection", 2019 IEEE.

N. Chaabouni et al., "Network Intrusion Detection for IoT Security Based on Learning Techniques", IEEE Communications Surveys & Tutorials, vol. 21, No. 3, Third Quarter 2019.

P. Freitas De Araujo-Filho et al: "Intrusion Detection for Cyber-Physical Systems Using Generative Adversarial Networks in Fog Environment", IEEE Internet of Things Journal, IEEE, USA, vol. 8, No. 8, Sep. 18, 2020.

P. Freitas et al., Intrusion Detection for Cyber-Physical Systems Using Generative Adversarial Networks in Fog Environment, IEEE Internet of Things Journal, vol. 8, No. 8, Apr. 15, 2021.

P. Illy et al., "Securing Fog-to-Things Environment Using Intrusion Detection System Based on Ensemble Learning", 2019 IEEE Wireless Communications and Networking Conference (WCNC).

R. Alguliyev et al., "Cyber-physical systems and their security issues, Computers in Industry", vol. 100, Sep. 2018, pp. 212-223.

S. Bai et al., "An Empirical Evaluation of Generic Convolutional and Recurrent Networks for Sequence Modeling", arXiv:1803.01271v2 [cs.LG], 14 pages, Apr. 19, 2018.

S. Han et al., "Intrusion Detection in Cyber-Physical Systems: Techniques and Challenges", IEEE Systems Journal, vol. 8, No. 4, Dec. 2014.

S. Huang et al., "HitAnomaly: Hierarchical Transformers for Anomaly Detection in System Log", IEEE Transactions on Network and Service Management, vol. 17, No. 4, Dec. 2020.

S. Prabavathy et al., "Design of Cognitive Fog Computing for Intrusion Detection in Internet of Things", Journal of Communications and Networks, vol. 20 , No. 3, Jun. 2018.

S. Y. Ozgumus, "Adversarially Learned Anomaly Detection Using Generative Adversarial Networks", Department of Electronics, Informatics and Bioengineering M.Sc. course of Computer Science and Engineering, 2019.

S.E. Yi et al., "A Comparison of LSTMs and Attention Mechanisms for Forecasting Financial Time Series", arXiv:1812.07699v1 [cs.LG] Dec. 18, 2018.

T. N. Duc et al., "Convolutional Neural Networks for Continuous QoE Prediction in Video Streaming Services", Received May 4, 2020, accepted Jun. 11, 2020, date of publication Jun. 22, 2020, date of current version Jul. 2, 2020., vol. 8, 2020.

T. Schlegl et al., f-AnoGAN: "Fast unsupervised anomaly detection with generative adversarial networks", Medical Image Analysis, vol. 54, May 2019, pp. 30-44.

Y. Jia et al., "FlowGuard: An Intelligent Edge Defense Mechanism Against IoT DDoS Attacks", IEEE Internet of Things Journal, vol. 7, No. 10, Oct. 2020.

Y. Li et al., "Detecting Anomalies in Intelligent Vehicle Charging and Station Power Supply Systems With Multi-Head Attention Models", IEEE Transactions on Intelligent Transportation Systems, vol. 22, No. 1, Jan. 2021.

Y. Yang et al., "A Survey on Security and Privacy Issues in Internet-of-Things", IEEE Internet of Things Journal, vol. 4, No. 5, Oct. 2017.

International Search Report for PCT/IB2022/055261, mailing date of Sep. 12, 2022, 11 pages.

* cited by examiner

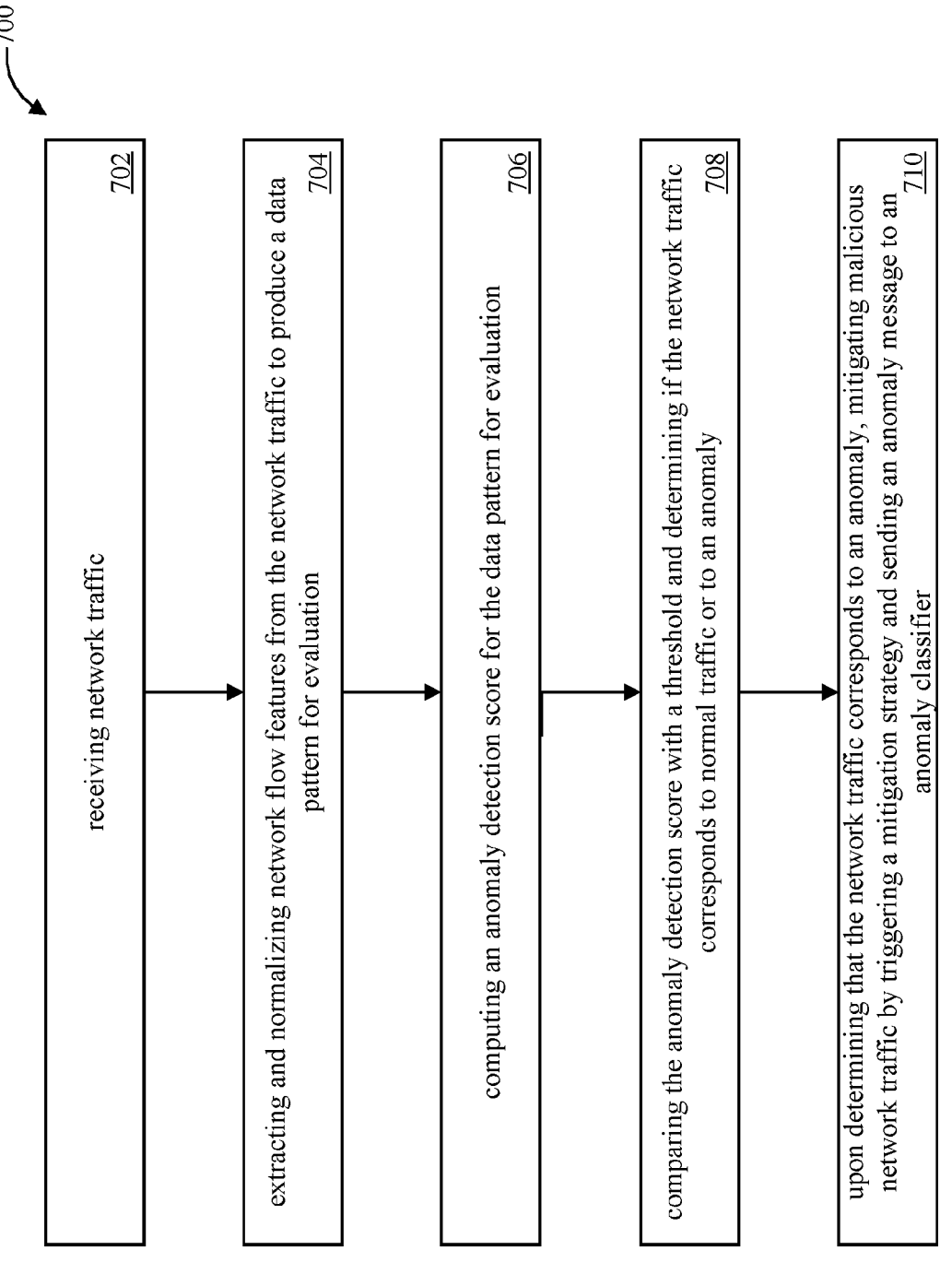

receiving network traffic  702 extracting and normalizing network flow features from the network traffic to produce a data pattern for evaluation  704 computing an anomaly detection score for the data pattern for evaluation  706 comparing the anomaly detection score with a threshold and determining if the network traffic corresponds to normal traffic or to an anomaly  708 upon determining that the network traffic corresponds to an anomaly, mitigating malicious network traffic by triggering a mitigation strategy and sending an anomaly message to an anomaly classifier  710

Figure 7

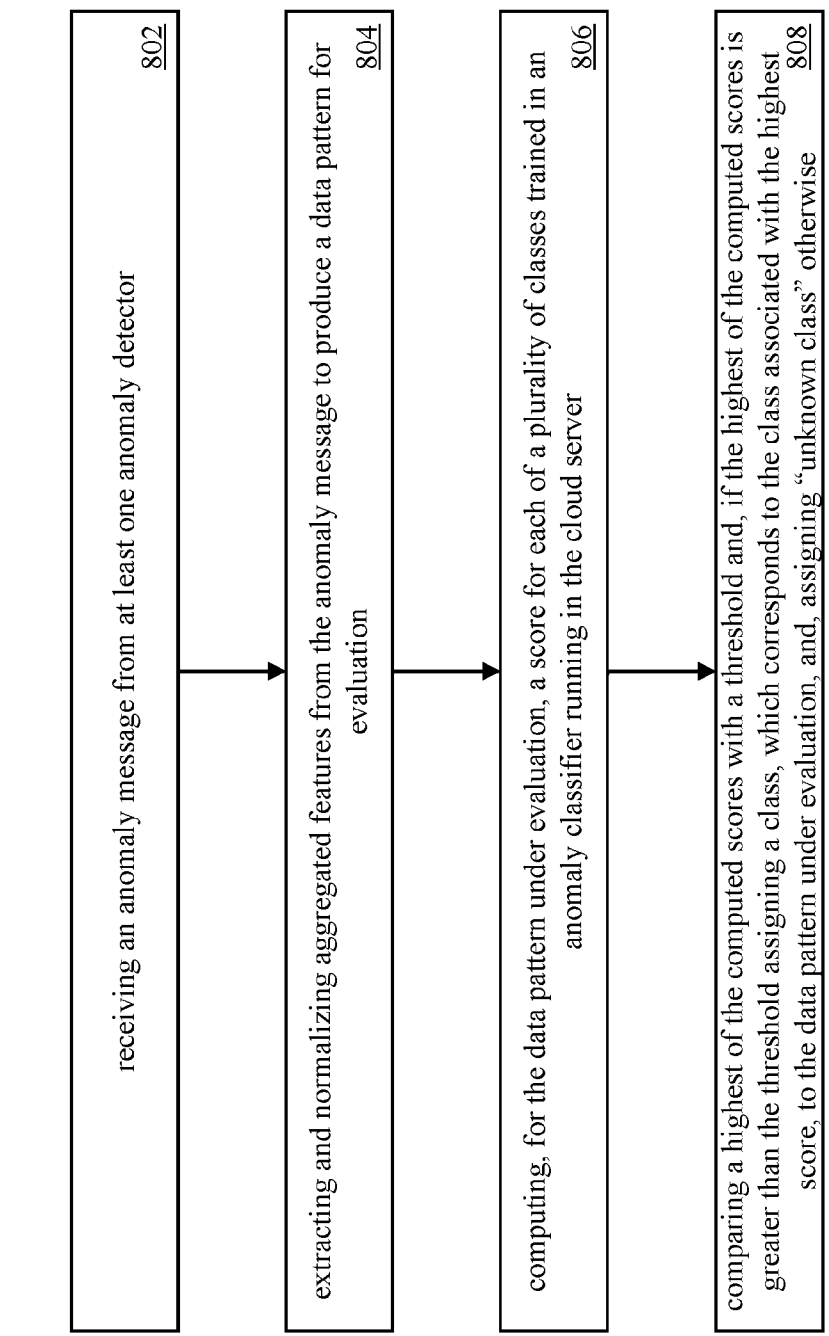

800 receiving an anomaly message from at least one anomaly detector 802 extracting and normalizing aggregated features from the anomaly message to produce a data pattern for evaluation 804 computing, for the data pattern under evaluation, a score for each of a plurality of classes trained in an anomaly classifier running in the cloud server 806 comparing a highest of the computed scores with a threshold and, if the highest of the computed scores is greater than the threshold assigning a class, which corresponds to the class associated with the highest score, to the data pattern under evaluation, and, assigning "unknown class" otherwise 808

UNSUPERVISED GAN-BASED INTRUSION DETECTION SYSTEM USING TEMPORAL CONVOLUTIONAL NETWORKS, SELF-ATTENTION, AND TRANSFORMERS

PRIORITY STATEMENT UNDER 35 U.S.C. S.119(E) & 37 C.F.R. S.1.78

This non-provisional patent application claims priority based upon the prior U.S. provisional patent application entitled "UNSUPERVISED GAN-BASED INTRUSION DETECTION SYSTEM USING TEMPORAL CONVOLUTIONAL NETWORKS, SELF-ATTENTION, AND TRANSFORMERS", application No. 63/197,571, filed Jun. 7, 2021, in the names of FREITAS DE ARAUJO FILHO et al.

TECHNICAL FIELD

The present disclosure relates to the detection of cyber-attacks in a distributed network.

BACKGROUND

The fifth generation (5G) of cellular networks is redefining the way we interact with our surroundings by providing connectivity to a massive number of devices with highly diverse requirements. This technology boosts the internet of things (IOT), which is the backbone in many industries such as smart-homes, smart-cities, autonomous vehicles and much more. On the other hand, the widespread adoption of such connected devices increases the attack surfaces and introduces several security threats that may cause network integrity impairment and inaccurate sensing and control of systems. Such vulnerability can severely damage physical objects and even risk people's lives. Despite numerous security solutions available in the traditional Internet, the IoT environment brings new security challenges, such as limited battery and computing power, that thwart the deployment of most security mechanisms based on cryptography and authentication. To overcome these challenges, machine learning-based intrusion detection systems (IDSs) have emerged as a fundamental component to detect cyber-attacks, and hence protect and secure systems and networks.

Although different approaches have been presented for detecting cyber-attacks, there are still several challenges that need to be addressed. First, intrusion detection solutions must be able to detect distributed attacks. For instance, sophisticated cyber-attacks, such as modern distributed denial-of-service (DDoS) attacks, may be launched from different applications across different locations. Such attacks are very challenging to detect and require multiple IDS instances to exchange information.

Second, since new attacks are constantly launched, IDSs must be able to detect both known and zero-day attacks. In addition, since obtaining labelled attack data is very challenging, time-consuming, and sometimes even impossible, e.g., for zero-day attacks, IDSs need to consider unlabeled attack data. However, even when using sophisticated deep learning algorithms, most existing unsupervised IDSs present high false positive rates and long detection times, which may compromise the proper functioning of systems.

Finally, most existing IDSs rely on long short-term memory (LSTM) networks to consider time-dependencies among data, which are present in a considerable amount of real-world data, including network traffic. However, recent studies show that LSTM networks present several drawbacks, which put in doubt their status as the standard architecture for sequence modeling tasks. For instance, LSTM networks process data sequentially, which significantly increases their computational complexity and challenges their performance on devices with limited computational power. Moreover, LSTM networks can easily consume a lot of memory just to store the partial results of multiple cell gates during training. Therefore, there is a need to propose novel unsupervised IDSs capable of tackling the aforementioned challenges while avoiding the drawbacks of LSTM networks.

SUMMARY

There is provided a method for detecting cyber-attacks at edge servers. The method comprises receiving network traffic. The method comprises extracting and normalizing network flow features from the network traffic to produce a data pattern for evaluation. The method comprises computing an anomaly detection score for the data pattern for evaluation. The method comprises comparing the anomaly detection score with a threshold and determining if the network traffic corresponds to normal traffic or to an anomaly. The method comprises, upon determining that the network traffic corresponds to an anomaly, mitigating malicious network traffic by triggering a mitigation strategy and sending an anomaly message to an anomaly classifier.

There is also provided a method for classifying cyber-attacks at a cloud server. The method comprises receiving an anomaly message from at least one anomaly detector. The method comprises extracting and normalizing aggregated features from the anomaly message to produce a data pattern for evaluation. The method comprises computing, for the data pattern under evaluation, a score for each of a plurality of classes trained in an anomaly classifier running in the cloud server. The method comprises comparing a highest of the computed scores with a threshold and, if the highest of the computed scores is greater than the threshold assigning a class, which corresponds to the class associated with the highest score, to the data pattern under evaluation, and, assigning "unknown class" otherwise.

There is also provided an edge server running an anomaly detector for detecting cyber-attacks. The edge server comprises processing circuits and a memory, the memory containing instructions executable by the processing circuits whereby the edge server running the anomaly detector is operative to receive network traffic. The edge server is operative to extract and normalize network flow features from the network traffic to produce a data pattern for evaluation. The edge server is operative to compute an anomaly detection score for the data pattern for evaluation. The edge server is operative to compare the anomaly detection score with a threshold and determine if the network traffic corresponds to normal traffic or to an anomaly. The edge server is operative to determine that the network traffic corresponds to an anomaly and mitigate malicious network traffic by triggering mitigation strategies and send an anomaly message to an anomaly classifier.

There is also provided a cloud server running an anomaly classifier for classifying cyber-attacks. The cloud server comprises processing circuits and a memory, the memory containing instructions executable by the processing circuits whereby the cloud server running the anomaly classifier is operative to receive an anomaly message from at least one anomaly detector. The cloud server is operative to extract and normalize aggregated features from the anomaly message to produce a data pattern for evaluation. The cloud server is operative to compute, for the data pattern under evaluation, a score for each of a plurality of classes trained in the anomaly classifier. The cloud server is operative to compare a highest of the computed scores with a threshold and, if the highest of the computed scores is greater than the threshold assign a class, which corresponds to the class associated with the highest score, to the data pattern under evaluation, and, assign "unknown class" otherwise.

There is also provided a system operative to detect and classify cyber-attacks. The system comprises a plurality of edge servers, each comprising an anomaly detector operative to detect the cyber-attacks. The system comprises a cloud server comprising an anomaly classifier operative to classify the cyber-attacks detected by the anomaly detector at each of the plurality of edge servers.

There is also provided a non-transitory computer readable media having stored thereon instructions for detecting cyber-attacks at edge servers, the instructions comprising any of the steps described herein.

There is also provided a non-transitory computer readable media having stored thereon instructions for classifying cyber-attacks at a cloud server, the instructions comprising any of the steps described herein.

The methods, edge server, cloud server, system and non-transitory computer readable media described herein provide improvements in terms of network security.

BRIEF DESCRIPTION OF THE DRAWINGS

FIG. 7 is a flowchart of a method for detecting cyber-attacks at edge servers.

FIG. 8 is a flowchart of a method for classifying cyber-attacks at a cloud server.

FIG. 10 is a schematic illustration of a virtualization environment in which the different methods, servers and system described herein can be deployed.

DETAILED DESCRIPTION

Figure 1:
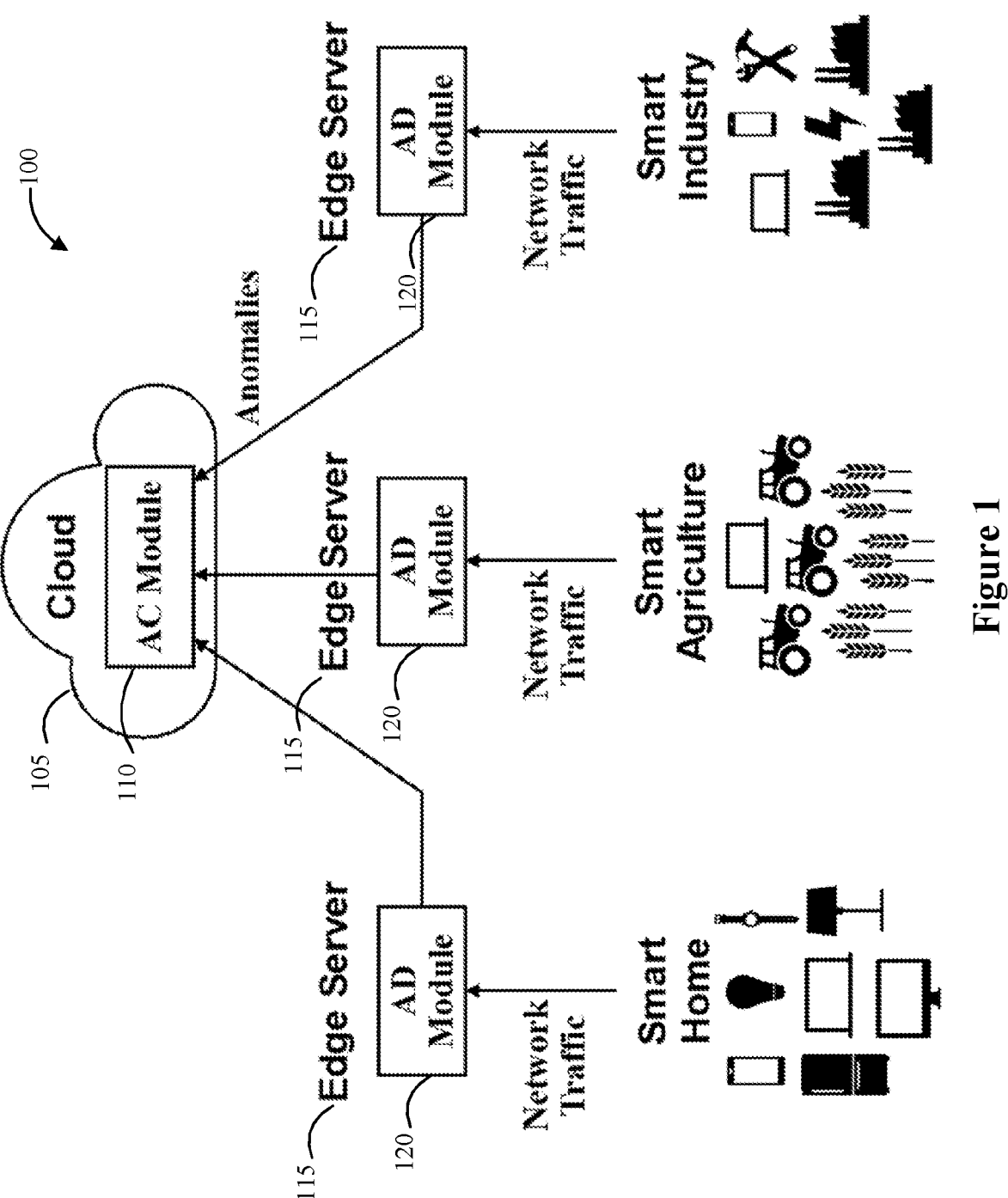
FIG. 1 is a schematic illustration of a System Deployment Architecture.

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

The system proposed herein is able to detect and classify cyber-attacks effectively and efficiently by monitoring and analyzing network traffic. To this end, a novel two-stage system is proposed that detects attacks at Anomaly Detector (AD) modules and then classifies the detected attacks at an Anomaly Classifier (AC) module.

AD modules consist of unsupervised anomaly detection systems that use a Generative Adversarial Network (GAN) to detect both known and zero-day attacks. GANs simultaneously train two competing neural networks, namely, generator and discriminator. The generator learns the probabilistic distribution of a training set, such that it can produce data similar to training data. The discriminator learns how to distinguish between real data and data produced by the generator. Thus, if the training set has only normal data, the discriminator learns how to distinguish between normal data and anomalies without requiring labeled attack data.

In contrast to most state-of-the-art unsupervised IDSs, which present high false positive rates and long detection times, the solution provided herein does not rely on LSTM networks. Instead, it uses Temporal Convolutional Network (TCN), Self-Attention, and Transformers in the GAN generator and discriminator networks. TCN, Self-Attention, and Transformers allow more parallelization of computations, have a constant number of sequentially executed operations, and have been showing more accurate results than LSTM networks in specific sequence modeling tasks.

Once AD modules detect anomalies, they forward them to the AC module, which analyze further and classify anomalies in a normal class, in one of several known attack classes, or in an unknown class. While AD modules are unsupervised to detect unknown attacks, the AC module employs supervised classifiers that are more accurate than unsupervised techniques. Thus, anomalies assigned to the normal class represent false positives from AD modules, i.e., normal traffic data that AD modules reported as anomalies. By detecting false positives, the AC module reduces the system's false positive rates. In addition, by classifying anomalies in different types of attacks, it allows different countermeasures to be taken for different types of attacks.

Moreover, when new and more recent datasets of network traffic are obtained, the proposed detection models retrain themselves following a federated learning approach, which reduces the number of data transfers and preserves privacy. This retraining operation contributes to keep the AD models up to date and reduces false negative rates, as it allows the detection of attacks that couldn't be identified by the previous models.

Furthermore, the proposed system leverages edge computing by deploying AD modules on edge servers closer to the network nodes under surveillance. These modules send detected anomalies to the AC module that is deployed on the cloud, such that the AC has information about anomalies detected on edge servers in different regions. Thus, the AC also detects when attacks occur in multiple locations at the same time, and concept drifts, which indicate that the detection models needs to be retrained.

The system proposed herein enhances network security by providing unsupervised detection of known and zero-day attacks using TCN, Self-Attention, and Transformers within a GAN, such that drawbacks of LSTM networks are avoided. The system provides a configurable architecture that allows achieving different trade-offs between detection rates and detection times, and thus satisfy different requirements.

The system allows reduction of false positive rates with an attack classification stage, which also allows specific countermeasures to be taken for different types of attacks. It allows reduction of false negative rates by detecting attacks simultaneously occurring in multiple locations, which cannot be detected by traditional anomaly detection solutions. And it allows reduction of false negative rates by retraining the detection models with a federated learning approach, as it allows detection of attacks that couldn't be identified by the previous models.

Solution Level Architecture

FIG. 1 shows the deployment of the proposed IDS. The proposed security solution 100 aims to detect and classify cyber-attacks on communication networks, such that countermeasures can be taken to hinder those attacks. The solution is intended for enterprises, cloud service providers, and communication service providers (CSP) to secure their networks and offer security as a service.

To reduce the time required to mitigate malicious network traffic, the proposed system leverages edge computing, which provides cloud-computing capabilities closer to consumers and to the data generated by applications. Thus, AD modules 120 are deployed as applications on edge servers 115, such that devices can send their network traffic for analysis and receive back alerts of detected attacks.

On the other hand, the AC module 110 is deployed as an application on the cloud 105. It receives anomalies detected by different AD modules, which allows it to become aware of attacks occurring in different locations and have a global view of attacks that simultaneously target different regions. This is essential for evaluating the potential risks and impacts of sophisticated distributed cyber-attacks, such that proper countermeasures can be taken, and detecting concept drifts, which indicate that the system must be retrained.

AD Modules—TCN/Self-Attention/Transformer GAN-Based IDS

Figure 2:
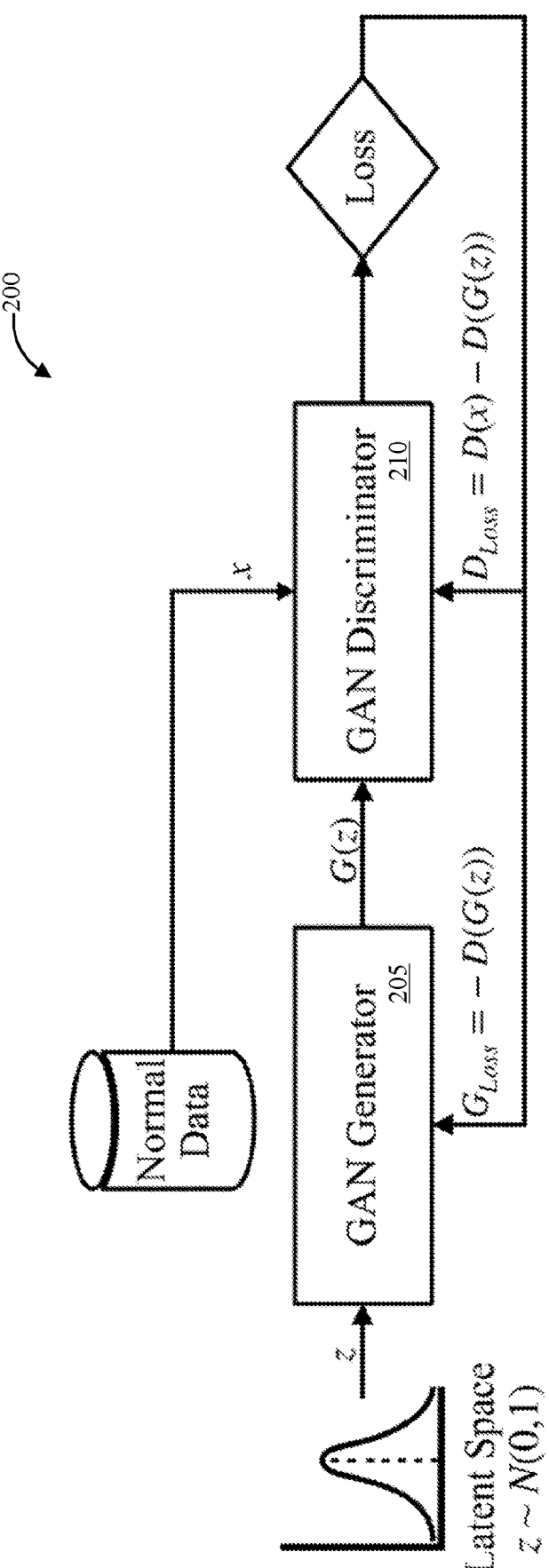
FIG. 2 is a block diagram of a WGAN Training Framework.

Referring to FIG. 2, GANs are powerful frameworks 200 for training generator and discriminator neural networks. When trained with only normal data, the generator 205 implicitly models the system and learns how to produce data patterns similar to normal data. It learns to map random vectors z, drawn from a distribution P(z) in a latent Z-Space, to data patterns similar to normal data, such that $x_{fake}$=G(z). On the other hand, the discriminator 210 learns to distinguish between real normal data patterns, $x_{real}$, and data patterns produced by the generator, $x_{fake}$. Thus, the discriminator's output, D (x), indicates whether a data sample x is real or produced by the GAN generator, i.e., it measures deviations from the normal behavior, and hence can be used to detect cyber-attacks.

The generator and discriminator neural networks are trained together in an adversarial process, such that the generator tries to maximize the probability of producing outputs recognized as real, and the discriminator tries to minimize that same probability. In the proposed system, a GAN is trained according to the Wasserstein GAN (WGAN) framework, in which the generator maximizes $G_{Loss}$= −D(G(z)) and the discriminator minimizes $D_{Loss}$=D(x)−D(G (z)). In contrast to the original GAN formulation, the WGAN is easier to train and does not suffer from the gradient vanishing problem. FIG. 2 shows the adopted WGAN's training mechanism.

Temporal Convolutional Networks

TCNs refer to modified convolutional architectures for sequence prediction tasks. They map input sequences into output sequences of the same length and use causal convolutions, i.e., convolutions that only use information from the past. Thus, an output at time t is convolved only with elements from times earlier than t in the previous layer. In addition, TCNs also employ dilated convolutions to allow the architecture to look far into the past. Thus, for an input sequence x∈ $\mathbb{R}^n$ and a filter f:{0, ..., k−1}→ $\mathbb{R}$, the dilated convolution on an element s of the sequence is defined as:

$$F(s) = (x *_d f)(s) = \sum_{i=0}^{k-1} f(i)x_{s-d_i},$$

where k is the filter size and d is the dilation factor. Finally, TCN networks allow a residual connection so the architecture learns what modifications are imposed on the data, rather than only modifying it. This connection contributes to avoiding the gradient vanishing problem and consists of adding the input x to the output of a series of transformations T. It is given by:

$$O(x) = \Phi(x + T(x)),$$

where $\Phi$ is an activation function.

TCNs provide a powerful way to extract temporal dependencies among data and have been showing several advantages over LSTM networks for modeling sequences. First, since the same filter is used in all layers, computations can be performed in parallel, and input sequences can be processed as a whole. Consequently, TCNs do not need to store partial results of computations, and thus consume less memory during training. Finally, TCNs have been shown to have stabler gradients, which avoids the gradient vanishing and exploding problems.

Self-Attention and Transformers

Attention functions are defined as the mapping of a matrix of queries Q, a matrix of keys K, and a matrix of values V to an output. Scaled Dot Product Attention is one type of attention function, which computes a context matrix C as $$C = \text{Attetion}(Q, K, V) = Softmax\left(\frac{QK^T}{\sqrt{d_k}}\right)V,$$

where $d_k$ is the dimension of values. The matrices K and V usually correspond to input sequences x, whereas the matrix Q is composed of trainable parameters randomly initialized. The dot product between Q and $K^T$ gives a measure of the pairwise similarity between the matrices of queries and keys, which results in an attention score. Thus, the matrix C represents the intrinsic dependencies between representations of a sequence.

Moreover, it has been shown that using linearly projected queries, keys, and values h times with learned linear projections contributes to extracting relationships between data. Thus, multi-head attention (MHA) modules perform attention functions in parallel on each of the projected versions of queries, keys, and values, and then concatenate their outputs as $$MHA(Q, K, V) = W^0 Concat(head_1, \dots, head_h),$$

where $W^O$ is a parameter matrix and $$\text{head}_i = \text{Attention}(QW_i^Q, KW_i^K, VW_i^V). \; W_i^Q, W_i^K, \text{and } W_i^V$$

are parameter matrices that, respectively, project queries, keys, and values. Finally, self-attention considers that the K, V, and Q are the same, which allows modules to capture in-depth contextual information and relationships between data.

Transformers can be used for replacing recurrent and convolutional neural networks by attention mechanisms in sequence transduction models. It has an encoder-decoder structure, such that the encoder and decoder networks are composed of stacked MHA and fully-connected layers. Moreover, since the transformer does not include recurrent networks for remembering how sequences are fed into a model, i.e., the order of elements in the input sequence, it includes a positional encoding that gives the model a sense of order in the beginning of the encoder and decoder architectures.

Similarly to TCNs, attention mechanisms allow the extraction of dependencies among data and have been showing to outperform LSTM networks in several sequence modeling tasks. They exhibit greater capability to extract features than LSTM networks, which contributes to more accurate models. In addition, they can process sequences as a whole and they allow more parallelization of computations as MHA heads can run in parallel. Furthermore, while LSTM networks require O(n) sequential operations, TCN, self-attention, MHA, and transformers have a constant number of sequentially executed operations.

Detection Architecture

Figure 3:
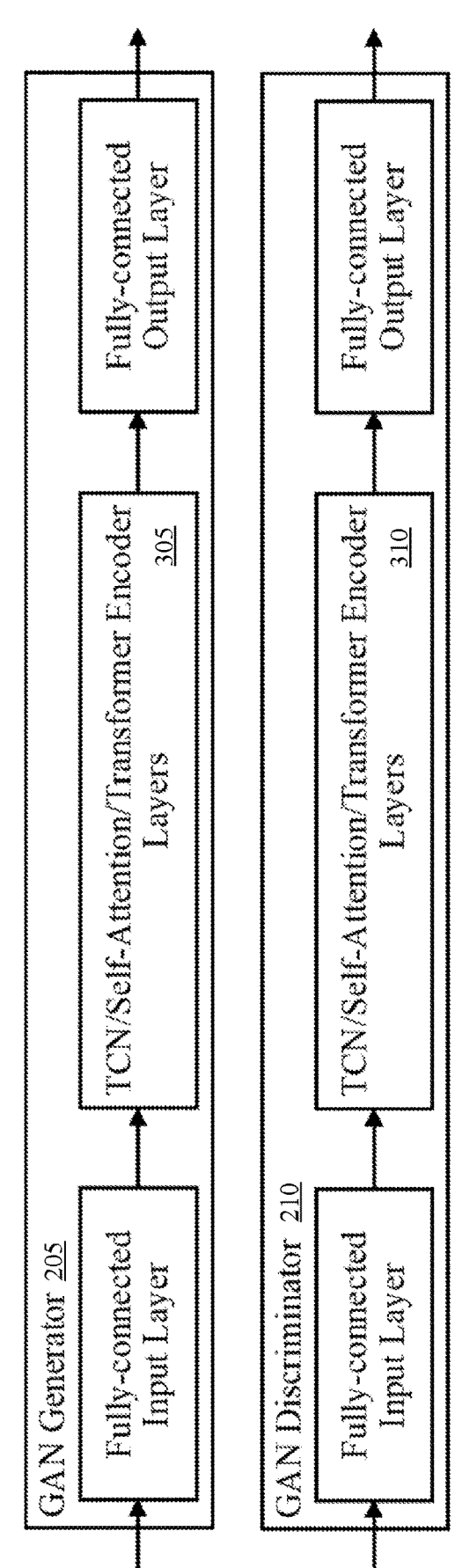
FIG. 3 is a block diagram of GAN Generator and Discriminator Architectures.

Referring to FIG. 3, the proposed detection architecture 300 consists of a GAN that relies on TCN, Self-Attention, or Transformer Encoders 305, 310 to consider time-dependencies among data. Since different applications may have different requirements and constraints, different architectures are proposed for the GAN generator and discriminator neural networks, such that different trade-offs are achieved between detection rates and detection times. The generator and discriminator networks are designed with one fully-connected input layer, one fully-connected output layer, and one or more blocks of hidden layers that are based on TCN, Self-Attention, and Transformer Encoders. FIG. 3 shows the proposed GAN generator and discriminator architectures.

Figure 4:
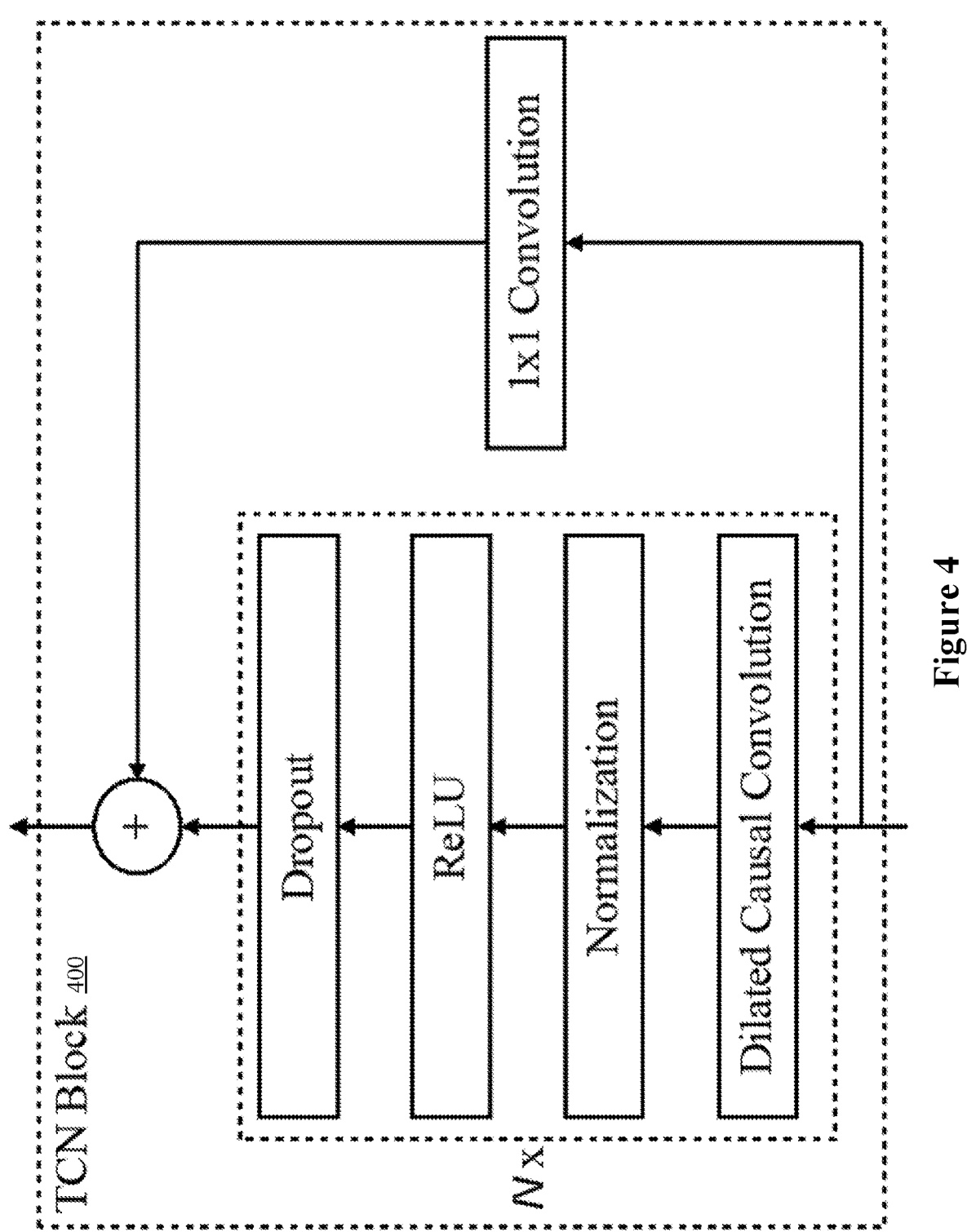
FIG. 4 is a block diagram of a TCN Block.

Referring to FIG. 4, the proposed TCN block 400 allows the architecture to learn from experience and consists of a single dilated causal convolution and a Rectified Linear Unit (ReLU) activation function. In addition, to avoid overfitting, it has a normalization and a dropout layer for regularization. This block can be replicated N times, such that a single convolution layer is responsible for the TCN residual connection. The number of dilated causal convolutions, i.e., the value of N, directly impacts the detection rates and detection times. While higher values of N may increase the IDS's ability to learn and detect attacks, it also increases the detection times, as the more layers, the longer the detection times. FIG. 4 shows the TCN block architecture.

Figure 5:
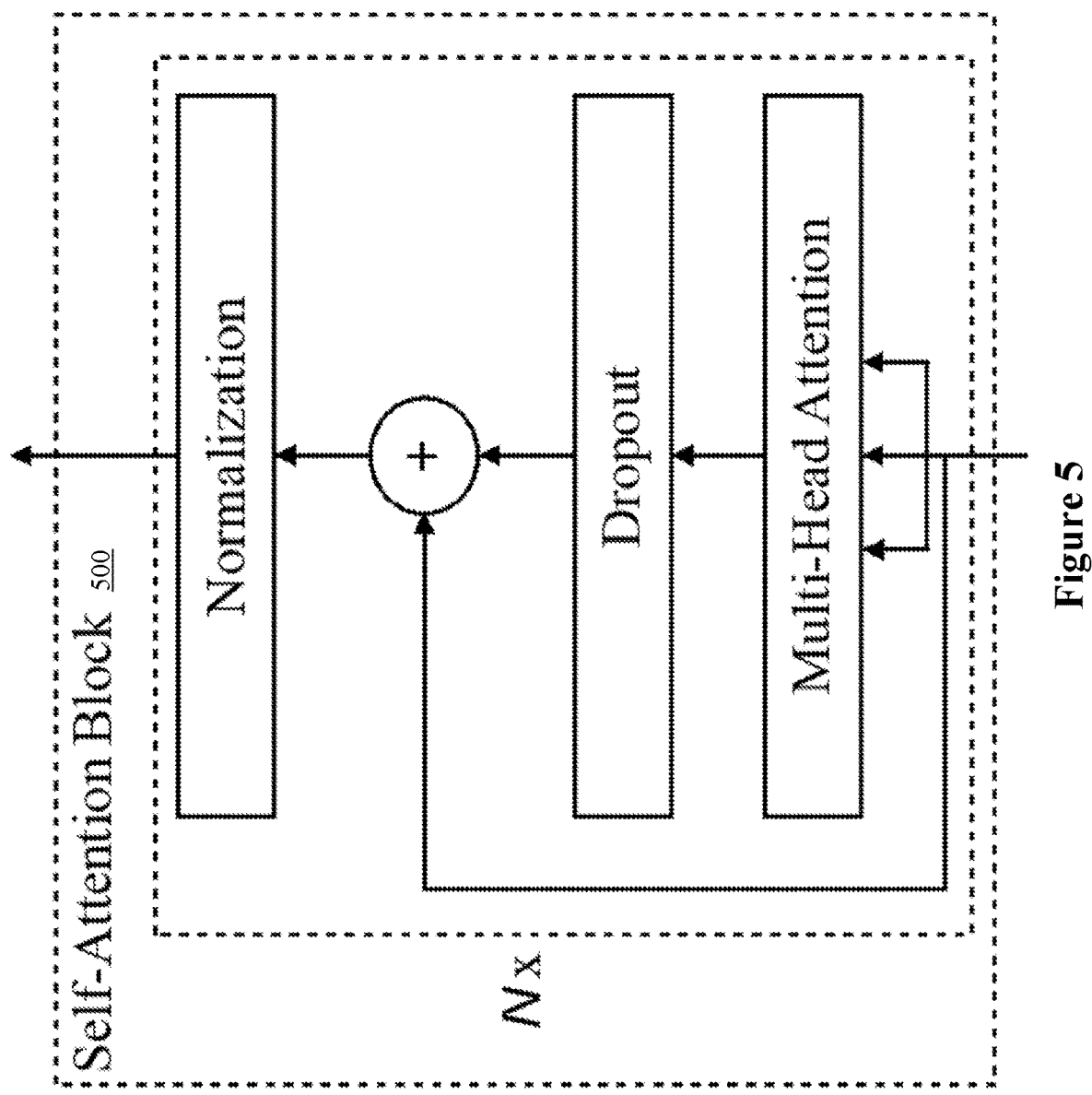
FIG. 5 is a block diagram of a Self-Attention Block.

Referring to FIG. 5, on the other hand, the proposed Self-Attention block 500 consists of a MHA module that uses self-attention. Similarly to the TCN block, normalization and dropout layers are used to avoid overfitting. Moreover, a residual connection is included to help with the network's training, as it allows gradients to flow through the network. Finally, N Self-Attention blocks can be cascaded to increase the IDS's ability to learn and detect attacks, at the expense of also increasing its detection time. FIG. 5 shows the Self-Attention block architecture.

Figure 6:
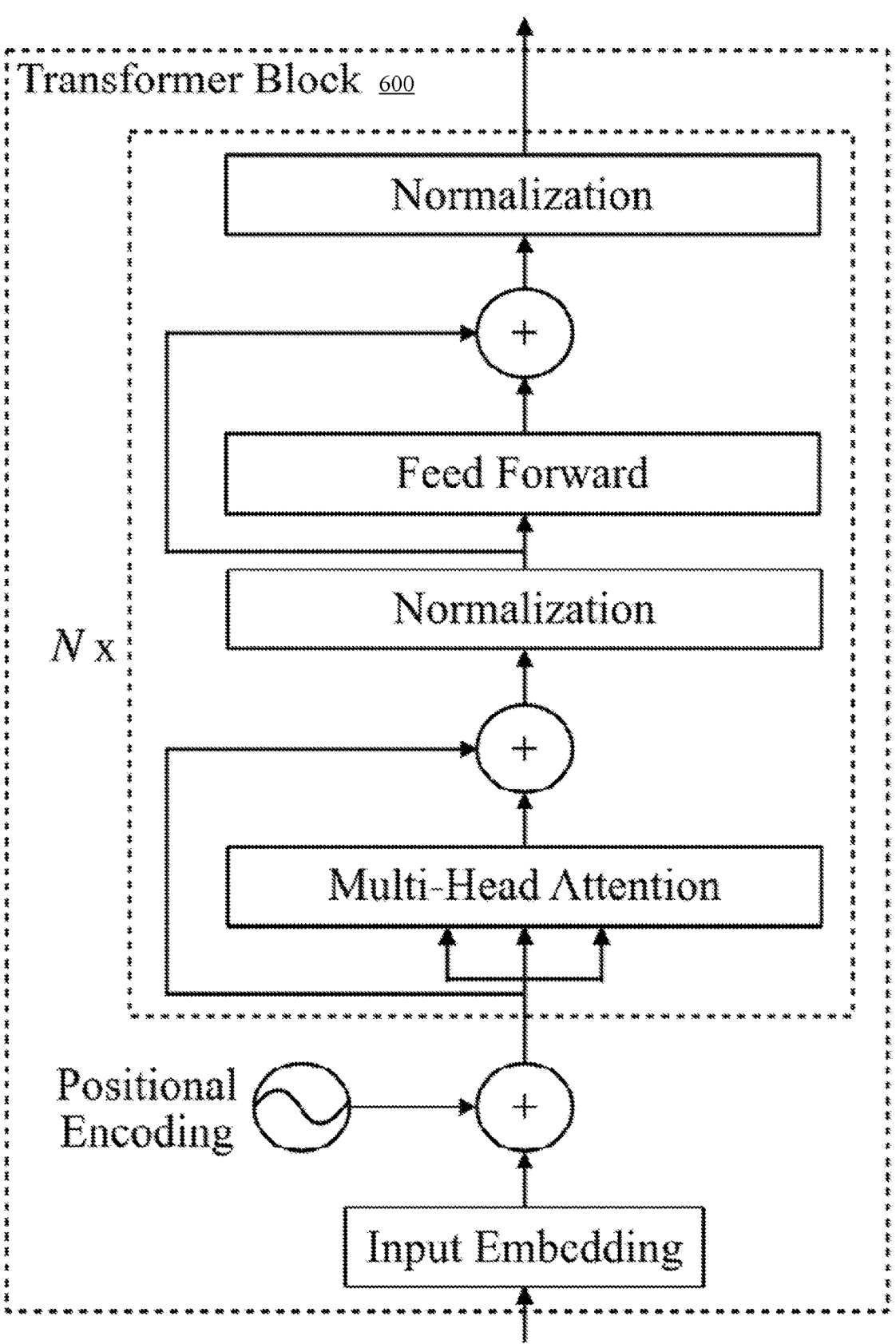
FIG. 6 is a block diagram of a Transformer Block.

Referring to FIG. 6, the proposed Transformer block 600 consists of a Transformer Encoder for sequence transduction tasks. As the Self-Attention block, it includes a multi-head attention and a normalization layer. However, it also includes a feedforward layer and introduces the input embedding and positional encoding. As before, N Transformer blocks can be cascaded to increase the IDS's ability to learn and detect attacks, at the expense of also increasing its detection time. FIG. 6 shows the Transformer block architecture.

Real-Time Operation

Anomaly Detectors

At detection time, AD modules work as follows. The AD modules receive network traffic. The AD modules extract and normalize network flow features, such as flow duration, total number of packets, number of flow packets per second, and number of flow bytes per second. The AD modules compute an anomaly detection score for a data pattern x under evaluation by computing $\text{ADS}(x)=\gamma L_D(x)+(1-\gamma)L_R(x)$, where $L_D(x)$ is the GAN discrimination loss, $L_R(x)$ is the GAN reconstruction loss, and $\gamma$ is a parameter that defines the contribution of each loss to the anomaly detection score. The discrimination loss corresponds to the discriminator's output. The reconstruction loss is the difference between x and its reconstruction through the generator.

The AD modules then compute $\Delta\text{ADS}(x)=\text{ADS}(x)-$ Anomaly Threshold, such that $\Delta\text{ADS}(x)\leq 0$ corresponds to normal traffic and $\text{AADS}(x)>0$ corresponds to anomalies. Anomaly Threshold is defined during the training of the GAN and can be updated whenever the GAN models are updated.

Then, if $\Delta\text{ADS}(x)>0$ the AD modules: mitigate malicious network flow by triggering countermeasures, such as temporarily dropping packets, resetting connections, deviating traffic, and notifying network hosts; construct a Report Anomaly Message containing a geographical location, a timestamp, a normalized network flow features of x; a computed $\Delta\text{ADS}$ value; and send the Report Anomaly Message constructed to the AC module.

Anomaly Classifier

At detection time, the AC module works as follows. The AC module receives report anomaly messages from AD modules. The AC module extracts and normalizes aggregated features by computing mean, standard deviation, maximum, minimum, and others on a time window TW for all flow features received from AD modules. The AC module computes scores for all classes trained in the classification model for a data pattern x under evaluation by using the received and computed features. As an example, if the classification model is trained with a normal class and four classes of known attacks, one vector with five class scores is obtained as follows:

$$[CS_{Normal}, CS_{Attack1}, CS_{Attack2}, CS_{Attack3}, CS_{Attack4}].$$

The AC module then compares the Highest Class Score with a Classifier Threshold (defined during the classifier's training) and assigns a class to vector x as follows:

Assigned Class=Class that has the Highest Class Score, if Highest Class Score>Classifier Threshold Assigned Class=Unknown Class, if Highest Class Score≤Classifier Threshold If Assigned Class=Normal Class, the AC module reverts mitigation triggered by AD module. If Assigned Class≠Normal Class the AC module verifies whether another mitigation strategy is more appropriated for the type of attack detected and trigger it.

Detection of Distributed Attacks and Concept Drifts

Since the AC module receives anomaly detection scores from AD modules deployed on different edge servers, it can detect concept drifts and cyber-attacks distributed across different locations as follows. The AC module computes aggregated features, such as mean, standard deviation, maximum, and minimum values, from the ΔADS values received in a time window T.

If the computed aggregated features exceed an acceptable limit, the AC module reports the occurrence of possible distributed attacks to the AD modules.

If concept drifts are detected, the AC module notifies the AD modules of the need to retrain the detection models with updated datasets.

Federated Learning Retraining Mechanism

The cloud application may send a validation set to AD modules on edge servers to evaluate their performance. Once an AD module receives a validation set, it computes and sends back to the cloud application the ΔADS values computed for each validation data sample. Then, the cloud application verifies the performance of each AD module on the validation set and decides which of them perform poorly and need to be retrained. In addition, the cloud application may also decide that AD modules need to be retrained by detecting concept drifts on the AC module. Finally, the cloud application sends new and more recent training dataset with normal traffic data from the network to the AD modules that need to be retrained.

The GAN-based detection models retrain themselves with the latest training dataset received, such that they are updated and improved. This allows the AD modules to detect cyber-attacks that couldn't be detected by previous models, which reduces the system's false negative rates. Such retraining procedure follows a federated learning approach, such that the GANs of all AD modules are retrained with the latest dataset received at all edge servers while only sharing the weights of neural networks. Since datasets are not transferred between AD modules, the number of data transfers is reduced and privacy is enhanced.

The federated learning retraining procedure of AD modules works as follows. The AD modules receive a validation set from the cloud application.

AD modules detect anomalies in the received validation set and send back a report with the ΔADS value computed for each validation data sample. The cloud application verifies the AD modules' validation performance, decides which of them need to be updated, and send them a new and more recent training dataset with normal traffic data from the network. The AD modules create a copy of their current GAN generator and discriminator neural networks and start retraining them with the latest training dataset received. The AD modules periodically send the weights of their generator and discriminator networks being trained to the cloud application. The cloud application averages and sends back the generator weights and discriminator weights received. The AD modules update their generator and discriminator weights by the values received from the cloud application and resume training. The AD modules replace their current GAN generator and discriminator models by the recently retrained ones.

FIG. 7 illustrates a method 700 for detecting cyber-attacks at edge servers. The method comprises receiving network traffic, step 702. The method comprises extracting and normalizing, step 704, network flow features from the network traffic to produce a data pattern for evaluation. The method comprises computing, step 706, an anomaly detection score for the data pattern for evaluation. The method comprises comparing, step 708, the anomaly detection score with a threshold and determining if the network traffic corresponds to normal traffic or to an anomaly. The method comprises, upon determining that the network traffic corresponds to an anomaly, mitigating, step 710, malicious network traffic by triggering a mitigation strategy and sending an anomaly message to an anomaly classifier.

Computing the anomaly detection score may be done using an anomaly detector that uses a generative adversarial network (GAN) comprising a generator and a discriminator. The generator may learn a probabilistic distribution of a training set, enabling production, by the generator, of data similar to the training set and the discriminator may learn how to distinguish between real data and data produced by the generator. The training set may comprise only data corresponding to normal traffic, thereby enabling the discriminator to distinguish between the learned normal traffic and anomalies without requiring labeled data corresponding to anomalies.

The GAN may comprise at least one of each of a temporal convolutional network (TCN) block, a self-attention block, and a transformer block. The extracting and normalizing network flow features from the network traffic, may comprise extracting and normalizing flow duration, total number of packets, number of flow packets per second, and number of flow bytes per second. Other network flow features could be extracted and normalized.

The mitigation strategy may be selected among any one or more of temporarily dropping packets, resetting connections, deviating traffic, and notifying network hosts. Other types of mitigation strategies may also be used.

The anomaly message may comprise a geographical location, a timestamp, normalized network flow features, and a computed anomaly detection score value. The threshold may be defined during the training of the GAN and may be updated when the GAN is updated.

FIG. 8 illustrates a method 800 for classifying cyber-attacks at a cloud server. The method comprises receiving, step 802, an anomaly message from at least one anomaly detector. The method comprises extracting and normalizing, step 804, aggregated features from the anomaly message to produce a data pattern for evaluation. The method comprises computing, step 806, for the data pattern under evaluation, a score for each of a plurality of classes trained in an anomaly classifier running in the cloud server. The method comprises comparing, step 808, a highest of the computed scores with a threshold and, if the highest of the computed scores is greater than the threshold assigning a class, which corresponds to the class associated with the highest score, to the data pattern under evaluation, and, assigning "unknown class" otherwise.

Extracting and normalizing aggregated features from the anomaly message, may comprise computing mean, standard deviation, maximum and minimum on a time window for all features from the anomaly message. Other types of values may also be computed.

If the class assigned to the data pattern under evaluation is a "normal class", the method may comprise reverting mitigation strategies triggered by a corresponding anomaly detector, otherwise it may be verified whether another mitigation strategy is more appropriate and triggering the other mitigation strategy if more appropriate.

Figure 9:
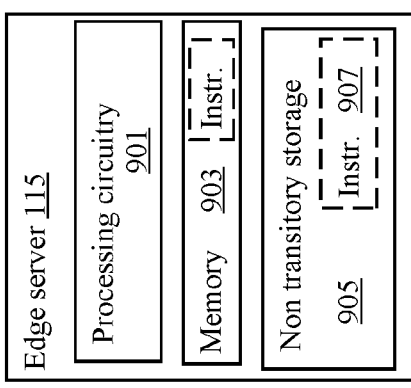
FIG. 9 is a schematic illustration of an edge server.

Referring to FIG. 9, there is provided an edge server 115 in which functions and steps described herein can be implemented.

Edge server 115 comprises processing circuitry 901 and memory 903. The memory can contain instructions executable by the processing circuitry whereby functions and steps described herein may be executed to provide any of the relevant features and benefits disclosed herein.

The edge server 115 may also include non-transitory, persistent, machine readable storage media 905 having stored therein software and/or instruction 907 executable by processing circuitry to execute functions and steps described herein.

Edge server 115 may of course comprise further hardware components, such as a power supply, communications interface, etc., as would be apparent to a person skilled in the art.

Figure 10:
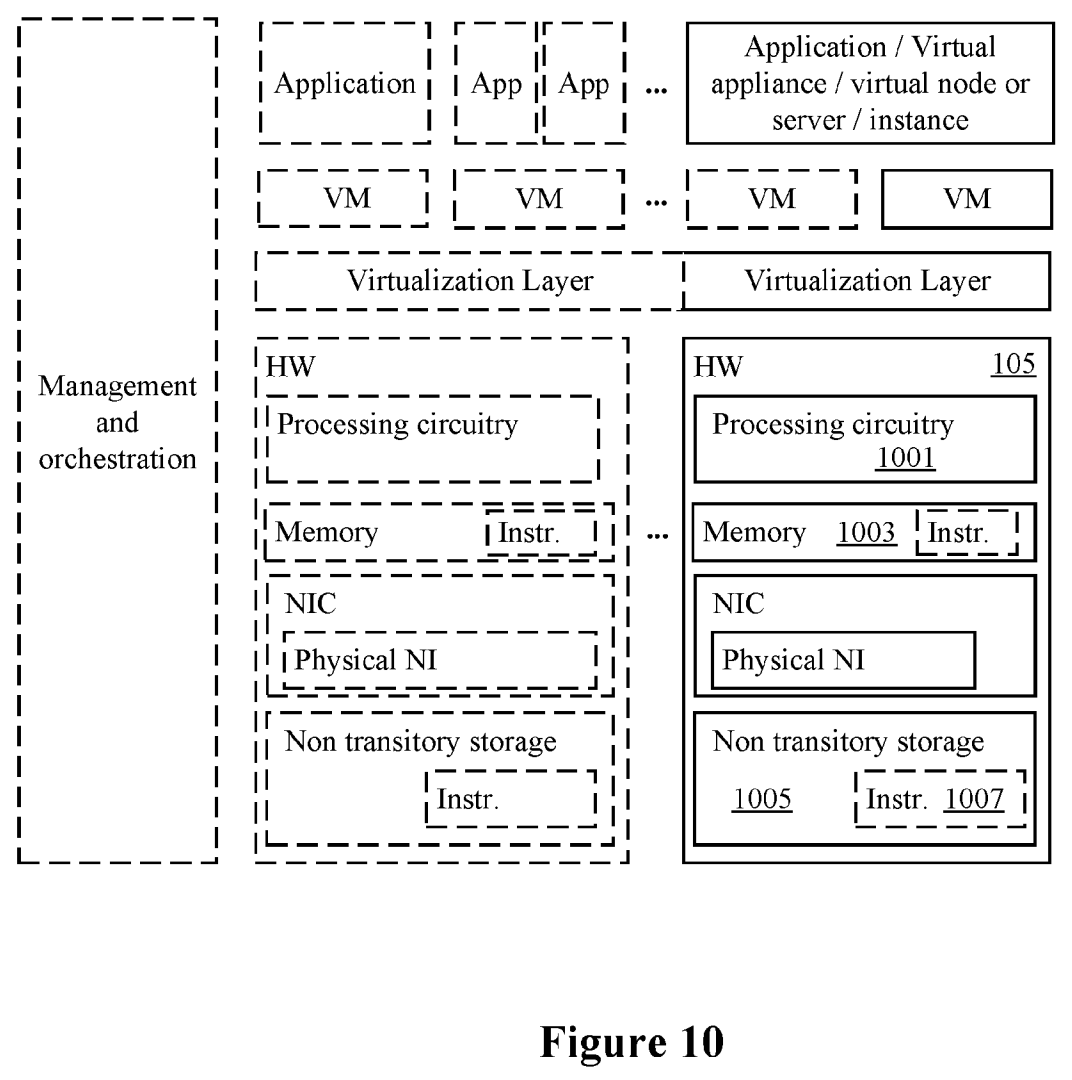

Referring to FIG. 10, there is provided a virtualization environment in which functions and steps described herein can be implemented.

A virtualization environment (which may go beyond what is illustrated in FIG. 10), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 1001 and memory 1003. The memory can contain instructions executable by the processing circuitry whereby functions and steps described herein may be executed to provide any of the relevant features and benefits disclosed herein.

The hardware may also include non-transitory, persistent, machine readable storage media 1005 having stored therein software and/or instruction 1007 executable by processing circuitry to execute functions and steps described herein.

Referring to FIGS. 1 and 9, there is provided an edge server 115, running an anomaly detector for detecting cyber-attacks. The edge server 115 comprises processing circuits 901 and a memory 903, the memory containing instructions executable by the processing circuits whereby the edge server running the anomaly detector is operative to receive network traffic. The edge server 115 is operative to extract and normalize network flow features from the network traffic to produce a data pattern for evaluation. The edge server 115 is operative to compute an anomaly detection score for the data pattern for evaluation. The edge server 115 is operative to compare the anomaly detection score with a threshold and determine if the network traffic corresponds to normal traffic or to an anomaly. The edge server 115 is operative to determine that the network traffic corresponds to an anomaly and mitigate malicious network traffic by triggering mitigation strategies and to send an anomaly message to an anomaly classifier.

The edge server 115 may further be operative to retrain the anomaly detector, using federated learning, when triggered by a cloud server running the anomaly classifier upon obtention of new datasets of network traffic.

The edge server 115, may further be operative to receive a new training dataset with normal traffic data from the cloud server. The edge server 115, may further be operative to start retraining a GAN generator neural network and a GAN discriminator neural network of the anomaly detector. The edge server 115, may further be operative to periodically send weights of the neural networks of the generator and discriminator to the cloud server. The edge server 115, may further be operative to receive average generator weights and average discriminator weights from the cloud server. The edge server 115, may further be operative to update the weights of the neural networks of the generator and discriminator using the average generator weights and average discriminator weights received from the cloud server, and resume training. The edge server 115, may further be operative to replace the current GAN generator neural network and the GAN discriminator neural network with the retrained GAN generator neural network and GAN discriminator neural network.

The edge server 115, may further be operative to receive a validation dataset from the cloud server. The edge server 115, may further be operative to detect anomalies in the received validation dataset and send back a report with an anomaly detection score computed for each of a plurality of data sample of the validation dataset.

Referring to FIGS. 1 and 10, there is provided a cloud server 105 running an anomaly classifier for classifying cyber-attacks. The cloud server 105 may be a physical server running in a data center and/or a virtual server running in the cloud. The cloud server 105 comprises processing circuits 1001 and a memory 1003, the memory containing instructions executable by the processing circuits whereby the cloud server running the anomaly classifier is operative to receive an anomaly message from at least one anomaly detector. The cloud server 105 is operative to extract and normalize aggregated features from the anomaly message to produce a data pattern for evaluation. The cloud server 105 is operative to compute, for the data pattern under evaluation, a score for each of a plurality of classes trained in the anomaly classifier. The cloud server 105 is operative to compare a highest of the computed scores with a threshold and, if the highest of the computed scores is greater than the threshold assign a class, which corresponds to the class associated with the highest score, to the data pattern under evaluation, and, assign "unknown class" otherwise.

Referring to FIGS. 1, 9 and 10, there is provided a system 100 operative to detect and classify cyber-attacks. The system 100 comprises a plurality of edge servers 115, each comprising an anomaly detector operative to detect the cyber-attacks. The system 100 comprises a cloud server 105 comprising an anomaly classifier operative to classify the cyber-attacks detected by the anomaly detector at each of the plurality of edge servers.

In the system, the anomaly classifier may be trained using supervised learning. The anomaly classifier may further be operative to detect attacks occurring at multiple locations at a same time and to classify the attacks occurring at multiple locations at a same time as distributed attacks. The anomaly classifier may further be operative to detect concept drifts and to trigger retraining of the anomaly detector at each of the edge servers.

Referring to FIG. 9, there is provided a non-transitory computer readable media 905 having stored thereon instructions 907 for detecting cyber-attacks at edge servers, the instructions may comprise any of the steps described herein.

Referring to FIG. 10, there is also provided a non-transitory computer readable media 1005 having stored thereon instructions 1007 for classifying cyber-attacks at a cloud server, the instructions may comprising any of the steps described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for detecting cyber-attacks at edge servers, comprising:

receiving network traffic;

extracting and normalizing network flow features from the network traffic to produce a data pattern for evaluation;

computing an anomaly detection score for the data pattern for evaluation;

comparing the anomaly detection score with a threshold and determining if the network traffic corresponds to normal traffic or to an anomaly;

upon determining that the network traffic corresponds to an anomaly, mitigating malicious network traffic by triggering a mitigation strategy and sending an anomaly message to an anomaly classifier;

retraining the anomaly detector, using federated learning, when triggered by a cloud server running the anomaly classifier upon obtention of new datasets of network traffic;

receiving a new training dataset with normal traffic data from the cloud server;

retraining a generative adversarial network (GAN) generator neural network and a GAN discriminator neural network of the anomaly detector;

periodically sending weights of the neural networks of the generator and discriminator to the cloud server;

receiving average generator weights and average discriminator weights from the cloud server;

updating the weights of the neural networks of the generator and discriminator using the average generator weights and average discriminator weights received from the cloud server, and resuming training; and replacing the current GAN generator neural network and the GAN discriminator neural network with the retrained GAN generator neural network and GAN discriminator neural network.

2. The method of claim 1, wherein the generator learns a probabilistic distribution of a training set, enabling production, by the generator, of data similar to the training set and wherein the discriminator learns how to distinguish between real data and data produced by the generator.

3. The method of claim 2, wherein the training set comprises only data corresponding to normal traffic, thereby enabling the discriminator to distinguish between the learned normal traffic and anomalies without requiring labeled data corresponding to anomalies.

4. The method of claim 1, wherein the GAN comprises at least one of each of a temporal convolutional network (TCN) block, a self-attention block, and a transformer block.

5. The method of claim 1, wherein the extracting and normalizing network flow features from the network traffic, comprises extracting and normalizing flow duration, total number of packets, number of flow packets per second, and number of flow bytes per second.

6. The method of claim 1, wherein the mitigation strategy is selected among any one or more of temporarily dropping packets, resetting connections, deviating traffic, and notifying network hosts.

7. The method of claim 1, wherein the anomaly message comprises a geographical location, a timestamp, normalized network flow features, and a computed anomaly detection score value.

8. The method of claim 1, wherein the threshold is defined during the training of the GAN and is updated when the GAN is updated.

9. An edge server running an anomaly detector for detecting cyber-attacks comprising processing circuits and a memory, the memory containing instructions executable by the processing circuits whereby the edge server running the anomaly detector is operative to:

receive network traffic;

extract and normalize network flow features from the network traffic to produce a data pattern for evaluation;

compute an anomaly detection score for the data pattern for evaluation;

compare the anomaly detection score with a threshold and determine if the network traffic corresponds to normal traffic or to an anomaly;

determine that the network traffic corresponds to an anomaly and mitigate malicious network traffic by triggering mitigation strategies and send an anomaly message to an anomaly classifier;

retrain the anomaly detector, using federated learning, when triggered by a cloud server running the anomaly classifier upon obtention of new datasets of network traffic;

receive a new training dataset with normal traffic data from the cloud server;

start retraining a GAN generator neural network and a GAN discriminator neural network of the anomaly detector;

periodically send weights of the neural networks of the generator and discriminator to the cloud server;

receive average generator weights and average discriminator weights from the cloud server;

update the weights of the neural networks of the generator and discriminator using the average generator weights and average discriminator weights received from the cloud server, and resume training; and replace the current GAN generator neural network and the GAN discriminator neural network with the retrained GAN generator neural network and GAN discriminator neural network.

10. The edge server of claim 9, wherein the edge server is further operative to:

receive a validation dataset from the cloud server; and detect anomalies in the received validation dataset and send back a report with an anomaly detection score computed for each of a plurality of data sample of the validation dataset.

* * * * *